(12) United States Patent
Reuschel et al.

(10) Patent No.: US 6,597,976 B2
(45) Date of Patent: Jul. 22, 2003

(54) TORQUE-TRANSMITTING SYSTEM AND METHOD OF OPERATING SAME

(75) Inventors: Michael Reuschel, Ottersweier (DE); Andreas Abele, Obertraubling (DE); Anton Fritzer, Markdorf (DE)

(73) Assignee: LuK Lamellen und Kupplungsbau Beteiligungs KG, Buhl (DE)

(*) Notice: Subject to any disclaimer, the term of this patent is extended or adjusted under 35 U.S.C. 154(b) by 141 days.

(21) Appl. No.: 09/804,087

(22) Filed: Mar. 12, 2001

(65) Prior Publication Data

US 2001/0046923 A1 Nov. 29, 2001

(30) Foreign Application Priority Data

Mar. 13, 2000 (DE) .......................................... 100 12 135

(51) Int. Cl.[7] .......................... F02D 43/00; B60K 41/12; G06G 7/70
(52) U.S. Cl. .......................... 701/51; 701/103; 123/436
(58) Field of Search .......................... 701/51, 103, 87, 701/53, 54, 67, 68, 89; 123/406.24, 436; 474/18, 28, 11, 70, 17; 477/37, 45, 46, 50, 115, 34, 92, 111, 116, 38, 39, 41, 36

(56) References Cited

U.S. PATENT DOCUMENTS

| | | | | |
|---|---|---|---|---|
| 4,440,279 A | * | 4/1984 | Schreiner | 192/30 W |
| 4,989,686 A | * | 2/1991 | Miller et al. | 180/197 |
| 5,011,458 A | * | 4/1991 | Kumm | 474/49 |
| 5,063,815 A | * | 11/1991 | Oshidari | 74/867 |
| 5,182,968 A | * | 2/1993 | Mott | 474/17 |
| 5,334,102 A | * | 8/1994 | Sato | 474/18 |
| 5,711,730 A | | 1/1998 | Friedman et al. | 474/18 |
| 5,795,262 A | * | 8/1998 | Robinson | 477/92 |
| 5,941,923 A | * | 8/1999 | Fischer et al. | 701/53 |
| 6,006,149 A | * | 12/1999 | Salecker et al. | 701/51 |
| 6,073,644 A | | 6/2000 | Friedmann et al. | 137/1 |
| 6,129,188 A | | 10/2000 | Friedmann et al. | 192/3.58 |
| 6,188,952 B1 | * | 2/2001 | Serra et al. | 701/103 |
| 6,358,181 B1 | * | 3/2002 | Friedmann et al. | 477/37 |

FOREIGN PATENT DOCUMENTS

| | | |
|---|---|---|
| DE | 195 44 644 | 6/1993 |
| DE | 195 46 293 | 6/1996 |
| DE | 195 46 294 | 6/1996 |
| DE | 197 21 036 | 11/1997 |
| DE | 197 27 358 | 1/1998 |
| DE | 198 26 747 | 1/1999 |

* cited by examiner

*Primary Examiner*—Tan Q. Nguyen
*Assistant Examiner*—Dalena Tran
(74) *Attorney, Agent, or Firm*—Darby & Darby (57) ABSTRACT

A torque-transmitting system such as continuously variable transmission for motor vehicle has an input device and an output device whose operating state can be described in terms of characteristic operating values. The input device and the output device are adjustable in relation to each other by adjusting a ratio between characteristic operating values, which has the result of changing the transmission ratio. An actuator device performs the functions of shifting the positions of the input and output device as well as holding the devices at a set position. A control device controls the actuator device through a control signal. A computing device performs calculations as well as learning and adapting processes involved in setting the value of the control signal.

58 Claims, 2 Drawing Sheets

TORQUE-TRANSMITTING SYSTEM AND METHOD OF OPERATING SAME

BACKGROUND OF THE INVENTION

The invention relates to a torque-transmitting system and to a method of operating a torque-transmitting system.

The term "torque-transmitting system" as used in the context of the present invention means an apparatus performing the function of converting one or more input torques, i.e., torques introduced into the apparatus, into one or more output torques. The output torques can, in particular, act as load quantities on mechanical elements that are spatially and functionally arranged outside the torque-transmitting system. In particular, the torque-transmitting system includes a clutch device or a transmission device such as a continuously variable transmission (CVT).

Torque-transmitting systems belong to the known state of the art.

OBJECT OF THE INVENTION

The present invention is based on the objective of providing a technically modified torque-transmitting system.

In particular, the invention is driven by the objective of providing an adjustable and controllable torque-transmitting system with improved accuracy in responding to controls and adjustments.

Under a further aspect, the invention aims to provide a design for a torque-transmitting system, in particular for a continuously variable transmission, that offers a simple way of adapting the control signals to a modified geometry of the torque-transmitting system. According to another aspect of the same invention, the object is to provide in a continuously variable transmission a simple, yet highly accurate way to control the holding forces for maintaining a transmission ratio at a set level and/or to control the ratio-changing forces for changing the transmission ratio from one level to another.

SUMMARY OF THE INVENTION

According to the invention, the foregoing objective is attained by a torque-transmitting system or a control device which, in addition to known state-of-the-art features, incorporates one or more of the features disclosed herein.

A torque-transmitting system according to a preferred embodiment of the invention includes several different modules or devices, as follows:

A) an input device and an output device that are adjustable in relation to each other by adjusting the ratio between a first and a second characteristic operating value, where the first characteristic operating value indicates an operating condition of the input device while the second characteristic operating value indicates an operating condition of the output device;

B) an actuator device that acts on the input- and/or output device in order to a adjust the position of these devices in relation to each other and/or in order to hold the devices at a set condition by exerting a predetermined holding force (or predetermined holding forces) on the input- and/or output device;

C) a control device that generates a control signal and transmits the control signal to the actuator device; thereby compelling the actuator device to act on the input- and/or output device as described above under B);

D) a computing device which computes and, if necessary, repeatedly adapts, a first at least two-dimensional characteristic data array that indicates how a third characteristic operating value is dependent on at least a fourth characteristic operating value of the torque-transmitting system, the third characteristic operating value being dependent in particular on the magnitude of the holding force or holding forces acting on the input- and/or output device at a given point in time.

A variation of the foregoing preferred embodiment includes the input, output, actuator, control and computing devices as described above under A) through D). Additionally included is a memory storage device for storing at least a first characteristic value which, at least in part, determines the signal transfer characteristics between the control device and the input- and/or output device. The computing device (in addition to any other computations that it may carry out) computes the control signal as a function of the first characteristic value, and the control signal compels the actuator to act as described above under B), if a set of predetermined conditions exists.

In another variation of the preferred embodiment, the computing device (in addition to any other functions that it may perform) contains at least a partial image representation of the coupling or conversion functions of the signal-transfer path between the control device and the input- and/or output device. In generating the control signal, the computing device will take the image representation of the coupling or conversion functions into account.

In particular, the signals transferred along the aforementioned signal-transfer path can be forces that are coupled to each other along a force-transfer path.

In yet another variation of the preferred embodiment, the computing device (in addition to other computations that it may perform) computes a predetermined third operating value dependent on a second and third characteristic data array. Both the second and third data array are at least two-dimensional. The second characteristic data array indicates how the second characteristic value depends on a fifth characteristic operating value, and the third characteristic data array indicates how the third characteristic value depends on a sixth characteristic operating value.

The object of the invention as stated above is further achieved by a method of operating a torque-transmitting system according to the embodiment or any of the variations described above. The method according to the invention has the steps of:

a) identifying among the characteristic operating values at least one on which the magnitude of a force depends that is generated in the input- and/or output device, particularly for holding a set transmission ratio between the input and output device and/or for shifting the positions of the input device and output device in relation to each other; and b) adapting the characteristic operating value that has been identified in step a).

A preferred embodiment of the method applies specifically to a continuously variable transmission, in which an endless flexible torque-transmitting device such as a belt or chain transmits a torque from the input device to the output device. In addition to the concept of adapting a characteristic operating value as described in steps a) and b) above, the process of operating the inventive torque-transmitting system also involves a concept of converting a signal from one type to another according to the following steps:

a') computing at least one actuator-control signal;

b') transmitting the at least one actuator-control signal along a signal-transfer path;

c') in the course of step b'), converting the at least one actuator-control signal at least once from one type of signal to another to another, where the different signal types can include electrical, mechanical, hydraulic, pneumatic signals, or also forces, moments, or any other suitable physical quantity;

d') delivering the converted actuator-control signal to the actuator device and thereby causing the latter to perform its holding and/or shifting function.

As a particular feature of the method just described, the conversion of step c') is taken into account when performing step a'), so that after the conversion in step c'), the converted control signal will have a magnitude corresponding to a predetermined target value.

As a particular feature of the invention, the torque-transmitting system is equipped with a computing device.

The computing device has the primary function of computing and/or repeatedly modifying at least a first, predetermined, two-dimensional characteristic data array. The first characteristic data array represents the functional dependency of a third characteristic operating value from at least a fourth characteristic operating value of the torque-transmitting system or of a motor vehicle that is equipped with the torque-transmitting system.

An at least two-dimensional data array in the particular sense of the present invention represents the functional dependencies between two, three or more characteristic values or characteristic operating values. In particular, the data array is or represents a characteristic curve. Particular attributes of an at least two-dimensional data array are that it can be continuous or discontinuous relative to two mutually associated dimensions and that it is or represents a functional connection or correlation between data pairs. The term "at least two-dimensional characteristic data array" stands for any kind of representation of correlated data, such as a graph, table, matrix, etc.

In particular, the aforementioned first characteristic data array represents the profile of the actuator force ratio. Preferably, the computing device is programmed to learn or adapt the profile of the actuator force ratio during operation of the torque-transmitting system or of a motor vehicle equipped with the torque-transmitting system. In particular, the profile of the actuator force ratio correlates the third characteristic operating value with predetermined operating points of the torque-transmitting system, where the predetermined working points are determined, e.g., by way of the fourth characteristic operating value such as the transmission ratio or the overall transmission ratio of the torque-transmitting system.

The third characteristic operating value in the sense of the present invention depends in particular on a force or holding force that acts on an input device or an output device of the torque-transmitting system and is applied to the input- and/or output device through an actuator device. In particular, this force is an axially directed force applied to a pair of conical discs of the input device and/or the output device in such a manner that a predetermined transmission ratio, i.e., a shift position of the input and output device, is either maintained or changed.

In particular, the third characteristic operating value is the actuator force ratio, i.e., the ratio between the axially directed force or holding force on the input device and the axially directed force or holding force on the output device. The input and output device are each equipped with a pair of conical discs. Under another preferred version of the same concept, the third characteristic operating value is an electric current that controls a solenoid valve in a hydraulic circuit, wherein the solenoid valve provides a pilot pressure or an actual working pressure to change the transmission ratio and/or to control the axial forces on the input device and/or the output device. In particular, the aforementioned solenoid valve, also referred to as transmission-ratio valve, allows the setting of the transmission ratio between the two pairs of conical discs, which are connected to each other through an endless flexible torque-transmitting device such as a chain or belt. With particular preference, the third characteristic operating value is given for a stationary operating point of the torque-transmitting system.

A fourth characteristic operating value is preferably defined as the transmission ratio or the overall transmission ratio of the torque-transmitting system. The transmission ratio in the particular sense of the present invention is the transmission ratio between the input device and the output device, while the overall transmission ratio may include additional transmission stages. As another preferred possibility, the fourth characteristic operating value is the engine rpm rate or the engine torque of a motor vehicle with a torque-transmitting system, or a temperature that occurs, e.g., at a predetermined location of the torque-transmitting system or of a motor vehicle.

As a particular feature of the invention, the torque-transmitting system is equipped with a computing device and in some cases with a memory storage device.

A memory device is used to store, among other data, one or more predetermined first characteristic values, which determine at least in part the signal transfer properties between a control device and an input device and/or output device.

In particular, a memory storage device serves to store predetermined functional relationships, such as functional dependencies expressed by formulas, between different first characteristic values. In particular, the memory storage device serves to store the correlation between the solenoid current of a valve such as a transmission-ratio valve on the one hand and on the other hand the resultant valve position or a pressure corresponding to the valve position, meaning in particular the pressure generated at one or both of the conical disc pairs as a result of the valve position. As a further preferred feature, the memory storage device is used to store the correlation between the pressure on the disc pair of the input- and/or output device, the effective surface area on which an axially directed force is generated on the first and/or second disc pair as a result of the pressure, and the magnitude of the force on the first and/or second disc pair. Preferably, the force acting on a disc pair should be understood as the sum of all forces that are generated by the actuator device and are acting on said disc pair. In some cases, this may exclude forces generated by the torque sensor and acting on one or the other of the disc pairs.

Stored functional dependencies or correlations are, in particular, dependent relationships existing between two or more than two first characteristic values. In particular, the term "first characteristic values" can refer to a variety of physical quantities, and the dependent relationships are, in particular, expressed through mathematical formulas.

In particular, a first characteristic value may be defined as anyone of the following: a pressure of a hydraulic fluid occurring at a predetermined location; a predetermined effective surface area against which a hydraulic pressure is acting in a pressure-actuated component of the torque-transmitting system; a spatial position of a component of the torque-transmitting system; a current supplied to a solenoid valve that is arranged at least in part within the control device or the actuator device, as well as other appropriate physical quantities.

The first characteristic values are either operating characteristics or permanently constant parameters and/or substantially constant parameters which, however, may change over the lifetime of the torque-transmitting system and/or its components in the presence of predetermined conditions; or the first characteristic values can be parameters that change if predetermined components are modified or exchanged in the course of maintenance, repair or other activities.

With particular preference, the stored correlations and/or the first characteristic values are at least in part indicative of the physical coupling relationships in the transfer chain from the control device to the input- and/or output device; and/or the first characteristic values are indicative of the geometry of the input- and/or output device, in particular the geometry of the disc pairs and/or the geometry of a hydraulic arrangement for applying pressure to the input- and/or output device. With preference, the control device or the actuator device is at least in part a hydraulic device, in which case at least one stored first characteristic value and/or the stored dependent functions of the first characteristic values for at least one location within the system are indicative of the correlation between the pressure of a hydraulic fluid and a force exerted by the hydraulic fluid on a component as a function of the effective fluid-exposed surface area of the component.

As a function of the at least one first characteristic value and/or of the stored dependent functions, a computing device preferably computes a control signal that determines the magnitude of a force to be applied to the input- and/or output device. The computing device is either an integral part of the control device or a separate device.

As a preferred feature of the invention, characteristic values that change over the lifetime or in the course of assembly, maintenance and repair work or values that represent characteristic operating values are under certain predetermined conditions updated or exchanged.

In preferred embodiments of the invention, the input- and/or output device each have a pair of conical discs, and the first characteristic values and/or the stored dependent functions of the first characteristic values describe the correlation between the pressure of a hydraulic fluid acting on the respective disc pair and the force that is generated on the disc pair as a result of the pressure. In some cases, this may exclude forces generated by the torque sensor and acting on one or the other of the disc pairs.

Preference is given to an input- and/or output device, each of which is equipped with a disc pair that is acted on by a hydraulic fluid in order to change and/or maintain a predetermined shift position, with the hydraulic fluid coming from a solenoid valve, such as a ratio-controlling valve, where the first characteristic value and/or the stored dependent function of the first characteristic value is indicative of a correlation between a predetermined value of the solenoid current and the pressure of the hydraulic fluid at a predetermined location such as, e.g., in the area of one of the disc pairs.

It should be noted that predetermined first characteristic values can in certain cases be provided or computed without storing them in a memory storage device.

The concept of memory storage in the context of the present invention should be understood to include a wide range of meanings, so that the term "storing" can include a short term availability of a value or characteristic value and/or a long-term storage of the value.

A computing device computes a control signal dependent on at least a first characteristic value.

Preferably, a control device under a set of predetermined conditions generates the control signal whose magnitude has been computed by the computing device and which effects the application or removal of an amount of actuator force or actuator pressure on the input- and/or output device.

As a particular feature of the present invention, the computing device contains at least a partial image representation of the coupling or conversion functions that describe, e.g., the propagation of forces along the signal-transfer path between the control device and the input- and/or output device. Preferably, the image representation is configured in such a way that for a majority of the preferably serially connected segments of the signal-transfer path, the image representation will allow for each segment the computation of an output signal (such as a current or force) as a function of an input signal (such as a current or force) and vice versa. Preferably, the image representation contains, among other elements, geometric parameters of components of the signal-transfer path or of the torque-transmitting system. As a preferred feature, the image representation allows the computation of a force on a component which occurs as a result of a pressure of a hydraulic fluid acting on the component. In particular, the image representation takes into account the surface area that is subjected to the hydraulic pressure, or more specifically, the projection of the surface area onto a plane that is perpendicular to the direction of movement performed by the component as a result of the pressure. Preferably, the image representation is based on the forces involved, so that for different segments of the signal-transfer path (which is at least partially designed as a force-transfer path), it is possible to compute the magnitude of the force that will be generated at that place in the force-transfer path as a consequence of a given control signal. With particular preference, the signal representation describes the physical effects by which the different manifestations of the signal are coupled to each other along the path.

In particular, the signal- or force-transfer path is the path along which a signal or a force is propagated between a control device and the input- and/or output device by way of the actuator device, if the control device issues a command for an amount of force to be applied to or removed from the input- and/or output device. Thus, the term path means any kind of appropriate physical connection or means of communication by which a command or signal generated in the control device effects a force in the input- and/or output device.

According to a preferred embodiment of the invention, the torque-transmitting system has two sets of conical discs, each of which can be subjected to a force and/or shifted to a different position by means of a hydraulic fluid. The hydraulic pressure acts on a predetermined surface area of the respective disc set. The image representation takes the pressure-exposed surface area into account or more specifically, the projection of the pressure-exposed surface area onto a plane that is perpendicular to the direction of the shift movement. The image representation takes further into account that a pressure acting on that surface area will generate a predetermined force on the respective disc set. With preference, the hydraulic arrangement further includes a solenoid-operated ratio-shifting valve, with the valve characteristic being taken into account in the image representation, so that the image representation includes the functional correlation between the hydraulic pressure occurring as a consequence of the valve position and the magnitude of the solenoid current delivered to the valve.

With particular preference, the image representation describes the correlation between the solenoid current of the ratio-controlling valve and the hydraulic pressure generated as a consequence of the solenoid current, as well as the further correlation between the hydraulic pressure and the force generated by the hydraulic pressure on one of both of the disc sets. Preferably, the signal-transfer path is configured so that it allows the computation of the forces acting on the input- and/or output device or, more particularly, on the disc sets of the input- and/or output device, and that the forces are represented as sums of different force components.

The force components are, e.g., different contributing parts of a force that are generated by a coarse control of the actuator force ratio and/or a coarse control of a target gradient and/or a fine-regulating process. The coarse control of the actuator force ratio causes the actuator force ratio to be set at a predetermined value. The coarse control of a target gradient causes the transmission ratio to be shifted to a predetermined speed at which the transmission ratio is being changed. The fine-regulating process serves in particular to effect a fine adjustment or fine control that is superimposed on the coarse control of the force ratio and/or the target gradient. As a particularly preferred concept of the invention, a predetermined value of either the overall force or at least a force component that is to be generated on the disc set of the input device and/or on the disc set of the output device, is used as the basis for computing a hydraulic pressure that is required for generating the targeted overall force or force component. As a further preferred concept of the invention, an image representation of the characteristic of a solenoid-operated transmission-ratio valve is used as the basis for computing the solenoid current that has to be set in the transmission ratio valve in order to generate the hydraulic pressure that is required in order to produce the targeted overall force or force component in the input- and/or output device. Preferably, the control device generates a control signal dependent on the value that has been computed for the solenoid current, and the control signal, in turn, causes a force to be applied to the input- and/or output device. In particular, the control signal is an electrical current and/or a voltage that will cause an electrical current to flow.

As a further particular feature of the invention, the control device, in the process of computing and/or generating a control signal required to apply or remove a predetermined amount of force on the input- and/or output device, takes into account the force-coupling effects that are present in the force-transfer path between the control device and the input- and/or output device.

It should be noted that in the context of the present invention, the application or removal of an amount of force on the input- and/or output device refers in particular to an axial force acting on the input- and/or output device.

As a further particular feature, the torque-transmitting system of the present invention includes a computing device that computes and/or describes a predetermined third characteristic operating value as a function of at least a second as well as at least a third characteristic data array. The second as well as the third characteristic data array are preferably made available independent of each other and, with particular preference, are tied together by arithmetic operations such as multiplication or addition or division or subtraction for the computation of a third characteristic operating value.

The second characteristic data array preferably describes how a second characteristic value depends on a fifth characteristic operating value of the torque-transmitting system or of a motor vehicle equipped with the torque-transmitting system. The third characteristic data array preferably describes how a third characteristic value depends on a sixth characteristic operating value of the torque-transmitting system or of a motor vehicle equipped with the torque-transmitting system.

It is particularly preferred to perform a separation of variables when computing the third characteristic operating value, where two or more characteristic data arrays describe how the third characteristic operating value depends on a characteristic operating value of the torque-transmitting system or of a vehicle equipped with the torque-transmitting system and wherein the characteristic data arrays can be tied together for the computation of the third characteristic operating value. It is also possible to use characteristic curves for the same purpose. In general, according to the invention, the computations just described can also be performed with characteristic curves instead of characteristic data arrays.

The fifth characteristic operating value is preferably dependent on the transmission ratio between the input device and the output device or on the overall transmission ratio, including the case that the fifth characteristic operating value is identical with the transmission ratio or the overall transmission ratio.

The sixth characteristic operating value is preferably a torque or is at least in part dependent on a torque such as the engine torque of a motor vehicle with a torque-transmitting system, or the torque that is acting on the input device, or any other appropriate kind of torque.

The fifth characteristic operating value is either dependent or independent of the sixth characteristic operating value.

Preferably, the first and/or second and/or third characteristic data array is updated or adapted in the presence of predetermined conditions, particularly while the torque-transmitting system is in operation. The adaptation process can in particular take changes into account that may have occurred in the characteristic data arrays as a result of wear or other factors associated with the operation of the torque-transmitting system. With particular preference, the third characteristic operating value is subject to change in the presence of predetermined conditions over the lifetime of the torque-transmitting system, which calls for the second and/or third characteristic data array to be adapted to the change.

Preferably, the characteristic data arrays are adapted either in accordance with the present invention as described herein or else in some other way.

A characteristic operating value in the sense of the present invention is a characteristic value whose magnitude or numerical amount is variable in the presence of predetermined conditions during operation, in particular while the torque-transmitting system or a vehicle equipped with the torque-transmitting system is in an operating state. A characteristic operating value is in particular an engine rpm rate or the rpm rate of an input shaft or of an input- or output device, a transmission ratio or overall transmission ratio between the input- and output device, or the pressure of an operating medium such as a hydraulic fluid, at a predetermined location, or a force at a predetermined location, or an electric current at a predetermined location, such as for example the solenoid current supplied to a valve, or any other appropriate physical quantity.

It should be noted that within the context of the present invention, the characteristic operating values and characteristic values are identified in part by numbers, with the understanding that different numbers can be used to identify one and the same characteristic operating value or different characteristic operating values.

A preferred embodiment of the torque-transmitting system according to the present invention has an input device and an output device that can be set at variable positions in relation to each other and/or are arranged to be movable. To effect a change in their settings, a force is preferably applied to the input- and/or output device, in particular by means of an actuator device. The preferred functions of the actuator device are to hold a predetermined relative position of the input device and/or output device. In particular, this includes the case where the input device and/or the output device is subjected to forces other than those effected by the actuator device, such as by an endless flexible torque-transmitting device, e.g., in the form of a chain or belt. In particular, the actuator device can apply to the input- and/or output device a force that causes a shift position either to be maintained or to be changed.

An input device of the torque-transmitting system in the sense of the present invention is a component or an assembly of a plurality of components by which energy, in particular mechanical energy, is introduced into the torque-transmitting system. Specifically, the input device is a pair of discs that are arranged on a common axis and can be set at a variable axial position in relation to each other. The two discs of the input device are in particular of a conical or frusto-conical shape and are oriented so that their conically tapered sides face each other. In the preferred application of the torque-transmitting system, the input device receives an input torque from a motor such as a combustion engine.

An output device in the sense of the present invention is a component or an arrangement of a plurality of components that serve to deliver energy or power or torque out of the torque transmitting system. Specifically, the output device is a pair of discs that are arrange on a common axis and can be set at a variable axial position in relation to each other. The two discs of the output device are in particular of a conical or frusto-conical shape and are oriented so that their conically tapered sides face each other. In the preferred application of the torque-transmitting system, the output device exerts an output torque on the drive train of a motor vehicle, so that a torque is transmitted between the output device and at least one axle of the vehicle.

As a preferred embodiment, the torque-transmitting system in the sense of the present invention is a continuously variable transmission (CVT).

With particular preference, the disc pairs of the input device as well as of the output device each include a pair of conical discs, where the two discs of a pair are arranged coaxially, next to each other, and axially movable in relation to each other, so that they can be set at variable axial positions in relation to each other and can be changed from one position to another.

Preferably, the torque-transmitting system is equipped with an endless flexible torque-transmitting device such as a chain-belt that runs in a loop around the disc pairs of both the input device and the output device and transmits a torque from one to the other of the disc pairs.

In its preferred form, the chain belt has transverse rows of multiple parallel links where each row of links is connected to its neighboring rows through pairs of transverse rocker bars extending through openings in the links. In the operating state of the torque-transmitting system, the rocker bars of a pair roll on each other in compressive contact along their curved rocker surfaces. As the belt chain passes between the conical disc pairs of the input device and the output device, the ends of the rocker bars are in frictional engagement with the conical surfaces of the discs.

In the preferred arrangement, the conical disc pairs of the input device and the output device are shifted simultaneously, so that when the discs are moved farther apart in one pair, they are moved closer together in the other, and vice versa. However, it also conceivable that the discs may be shifted independently of each other.

In a particularly preferred application of the foregoing arrangement, a change in the relative positions of the input and output device will cause a change in the ratio between a first characteristic operating value associated with the input device and a second characteristic operating value associated with the output device, so that the ratio can be adjusted by shifting the relative positions of the input and output device.

Specifically, the first characteristic operating value in the sense of the present invention is the rpm rate of the input device, i.e., of a first pair of conical discs, or a value that is a dependent function of the rpm rate of the input device.

Specifically, the second characteristic operating value in the sense of the present invention is the rpm rate of the output device, i.e., of a second pair of conical discs, or a value that is a dependent function of the rpm rate of the output device.

A change in the relative positions of the input device and the output device in the sense of the present invention means in particular a change in the spatial disposition of the entire input device in relation to the entire output device, or a change in the spatial disposition of a part of the input device in relation to a part of the output device. Preferably, the input device as well as the output device are each configured as a pair of conical discs, and the change in the relative position is effected by a change in the axial distance of the conical discs of the input device and/or of the output device.

The actuator device can be designed to work hydraulically and/or electrically, electro-magnetically and/or pneumatically, or may also be designed in some other way.

Preferably, the torque-transmitting system is equipped with a control device that is designed in particular as a pneumatic and/or hydraulic and/or electrical and/or electromagnetic device, or else may also be designed to work in some other way.

With preference, the control device generates a control signal that is transmitted to the actuator device, whereupon the actuator device applies to or removes from the input device and/or output device an amount of force that depends on the control signal.

The control signal is in particular an electrical current or a voltage that is applied preferably to a solenoid valve, or the control signal can also be a switching position or shifting position of a valve device or some other characteristic value.

Preferably, the actuator device includes a hydraulic arrangement and/or a so-called torque sensor. The torque sensor can have the function of generating or controlling a predetermined seventh characteristic operating value in function of a torque such as a torque of an input shaft of the torque-transmitting system, or an engine torque or other kind of torque. The seventh characteristic operating value is in particular the pressure of a hydraulic fluid in a predetermined pressure chamber, where preferably in function of the hydraulic pressure a predetermined force is generated on the input device or the output device.

Preferably, with a shift position having been set for the input device and/or output device, a predetermined holding force is applied to the input device and/or output device so that the set shift position will be maintained.

Preferably, the control device and/or the actuator device includes at least one solenoid valve which, in particular, is a ratio-shifting valve. A ratio-shifting valve in the sense of the current invention is in particular a valve device that can be shifted into different shift positions, whereby different pressure levels can be or are set in a hydraulic arrangement on the down-stream side of the ratio-shifting valve in relation to a pump, i.e., in the branch of the hydraulic circuit that leads in particular to the input device and/or output device. Dependent on the pressure levels set by the ratio-shifting valve, an amount of force is applied to the first and/or second disc pair, particularly in such manner that the transmission ratio between the input and output device will be changed as a result.

With particular preference, the actuator device is designed so that in the input device and/or output device, a predetermined holding force is generated for the purpose of maintaining a predetermined transmission ratio between the input device and the output device, and a predetermined ratio-shifting force is generated for the purpose of changing the transmission ratio. With particular preference, the ratio-shifting force is superimposed on the holding force during a ratio-shifting phase. Preferably, this is achieved by generating a base portion of the hydraulic pressure or, more specifically, of the actuator force, on which a controlling or regulating portion is superimposed in order to effect a predetermined ratio shift. In a particularly preferred arrangement, the ratio-shifting valve is supplied with a base portion of a current in order to effect the base portion of the ratio-shifting force. Further under the preferred arrangement, a controlling or regulating portion of the current is superimposed on the base portion, in order to generate the controlling or regulating part of the ratio-shifting force.

In accordance with a particularly preferred embodiment of the invention, the control device uses the third characteristic operating value to compute and/or control and/or generate a holding force to which the input device or the output device is subjected, and/or to generate a control signal. With particular preference, the third characteristic operating value and/or the first at least two/dimensional characteristic data array is used to control the transmission ratio between the input device and the output device. With special preference, the third characteristic operating value and/or the first at least two-dimensional characteristic data array is used for the base portion of the control of the transmission ratio, wherein an additional controlling or regulating signal is superimposed on the base portion to effect a fine adjustment of the transmission ratio.

To change the positions of the parts in relation to each other or, more specifically, to maintain the input device and/or the output device at a set position, the control device preferably sends a control signal to the actuator device, whereupon the latter applies to the input and/or output device an amount of force that depends on the control signal.

It is preferred under the invention to perform the adaptation of characteristic data arrays, specifically of the second and third characteristic data array, when the system is operating in a static or only mildly dynamic driving mode. A static driving mode is specifically a driving mode in which predetermined characteristic operating values remain substantially unchanged during the adaptation phase. A mildly dynamic driving mode is a mode in which predetermined characteristic values are subject to only a slow rate of change during the adaptation phase. The characteristic operating values that are subject to no change or only a slow and/or small change during the computation or adaptation of a characteristic data array are in particular characteristic operating values of the input device or, more specifically, characteristic operating values that are at least partially indicative of the state of rotation of the input device or of a component that delivers an input to the input device, such as, e.g., an rpm rate or a torque.

In accordance with a particularly preferred embodiment of the invention, the control signal is determined based on the third characteristic operating value that has been computed as a function of one or more characteristic data arrays.

It is preferable to use for the determination of the control signal and/or at least one of the characteristic data arrays a formulaic correlation between different fourth characteristic values and eighth characteristic operating values, where the formulaic correlation is based on the physical cooperative relationship between predetermined components and/or operating media of the torque-transmitting system or of a motor vehicle that is equipped with the torque-transmitting system.

A fourth characteristic value is in particular a predetermined surface area or portion of a surface area of a component of the torque-transmitting system, more specifically a surface exposed to the pressure of a hydraulic fluid, or the projection of the surface onto a plane that is perpendicular to the direction along which the component moves in response to the pressure.

An eighth characteristic operating value is in particular a pressure of an operating medium such as a hydraulic fluid at a predetermined place in the system and/or a force acting at a predetermined place in the force-transfer path between the control device and the input device and/or output device, and/or a current supplied to a solenoid valve such as a ratio-shifting valve.

The preferred way to determine a characteristic data array is by first computing or using individual fixed points. In particular, the fixed points are vectors whose components are assigned to the dimensions of the characteristic data array that is to be determined. The fixed points can be points of the array that is to be established, or they can be points outside the array. The fixed points can remain constant during the computation process, or they can be changed. The fixed points can be singular vectors, or they can in their entirety describe a characteristic data array.

In particular, it is possible to use empirical value for the fixed points, or to use characteristic data arrays that are given based on a predetermined characteristic curve. In particular, the fixed points in their combined entirety can describe a characteristic data array that was used in the past to operate the torque-transmitting system, i.e., an old data array of the torque-transmitting system.

The number of fixed points can be a predetermined given number, or it can be determined when making a modification in the fixed points or during an adaptation of the at least two-dimensional characteristic data array. The fixed points can be equidistant or non-equidistant with regard to their one- or more-dimensional distance. It is preferred to use five to twenty, with special preference eight to twelve, fixed points for the determination or adaptation of the characteristic data array.

Preferably, a greater number of fixed points are arranged in those portions of a characteristic data array where the data array is known or expected to have an instability than in those areas where no instabilities are expected to occur.

According to a particularly preferred embodiment of the invention, the characteristic data array to be adapted or determined depends on the transmission ratio between the input device and the output device, where one fixed point is arranged in an area of the array that corresponds to a near-maximum of the transmission ratio between the input device and the output device, and another fixed point is arranged in an area corresponding to a near minimum of the transmission ratio between the input device and the output device.

With preference, one fixed point is arranged in an area of the characteristic data array corresponding to a transmission ratio between 1.5 and 2.5 (2.0 being especially preferred) and another fixed point is arranged in an area of the characteristic data array corresponding to a transmission ratio between 11 and 13 (12.4 being especially preferred).

In determining and/or adapting the characteristic data array, it is preferred to adapt or determine local extremes, such as local minima and maxima of the characteristic data array. Preferably, the local extremes are subsequently used at least in part as fixed points.

As an especially preferred modus operandi, the fixed points or predetermined coordinates of the fixed points are at first set at a constant value, where the coordinates or fixed points are subsequently modified or adapted to points of the characteristic data array that is to be determined or approximated or adapted.

The concept of a fixed point in the context of the present invention should be understood to encompass a wide range of meanings. In particular, the term "fixed point" is used in the sense of a vector that describes a point of the at least two-dimensional characteristic data array to be adapted or determined, and on the other also in the sense of a vector whose coordinates are being modified in order to approximate or adjust the vector to a point of the data array to be adapted or determined.

In a preferred mode of operation, one determines local extremes of the characteristic data array to be adapted. The coordinates of the fixed point nearest to the local extreme are then replaced by the vector components of that local extreme.

With preference, at least one coordinate or all of the coordinates of the nearest fixed point are each replaced by the corresponding vector components of the local extreme, or individual coordinates of a fixed point are each replaced by the corresponding vector component of that local extreme that has the smallest difference to the respective coordinate of the fixed point, meaning that different coordinates of the same fixed point can be replaced by vector components belonging to different extremes.

Preferably, during the course of a computation and/or determination and/or adaptation of the fixed points and/or during the determination and/or adaptation of the characteristic data array, at least one predetermined ninth characteristic operating value of the torque-transmitting system or of a motor vehicle equipped with the torque-transmitting is kept within a predetermined range of values, or a verification is performed that the ninth characteristic operating value is within the predetermined range of values.

A range of values in the present context means in particular the totality of all values within a given interval or the totality of values defined by a plurality of non-contiguous intervals, or a single predetermined value.

A ninth characteristic operating value is in particular a transmission ratio between the input device and the output device and/or the engine torque and/or the engine rpm rate of a motor vehicle. For example, during the process of adaptation, there may be measures provided to ensure, or it may be a given prerequisite that the engine torque be preferably in a range between 50 and 80 newton-meters and/or that the engine rpm rate be in a range between 1500 and 2000 rpm. These numerical values are given only as examples and are in no way meant to limit the scope of the invention.

As a preferred mode of operation, one would at the outset determine a set of fixed points and then adapt or approximate the characteristic data array by means of mathematical curve-fitting methods such as linear interpolation or extrapolation or other suitable methods.

According to a preferred embodiment of the invention, a first step is to determine local minima and/or local maxima of the characteristic data array that is to be determined. Subsequently, these local minima and maxima are used as fixed points for the at least two-dimensional characteristic data array, using an appropriate procedure to complete the array between the fixed points, e.g., by linear interpolation, in order to compute, adapt, or approximate the characteristic data array.

The abscissae of the fixed points are spaced either at equidistant or non-equidistant intervals. Preferably, the number of fixed points is set at eight. Each fixed point is, e.g., a value pair in which one value represents an overall transmission ratio or a transmission ratio between the input device and output device and the other value represents a corresponding solenoid current flowing in a ratio-controlling valve or a value from which a solenoid current can be determined.

Preferably, the magnitude of the current is at first set at a constant value, where the coordinates of the individual fixed points that indicate transmission ratios are set at different values. Preferably, one of the values corresponds to a minimum transmission ratio and another value corresponds to a maximum transmission ratio or overall ratio. It is further preferred to use an empirically determined characteristic curve as a point of departure. In particular, this characteristic curve can represent a kind of average of the characteristic curves of different transmissions.

Preferably, the process of adapting the characteristic curve or the characteristic data array is started when the engine torque is within a predetermined interval, e.g., between 50 and 80 newton-meters, and the engine rpm rate, likewise, is within a predetermined interval, e.g., between 1500 and 2000 rpm. The next step, according to the preferred concept, is to determine local minima and/or maxima of the data array that is to be adapted. As soon as a local minimum and/or maximum has been found or approximately found, a fixed point (preferably the nearest one) is set at the value pair of that local minimum or maximum. In doing this, e.g., individual coordinates of the fixed point can be adjusted or replaced by the coordinates of the respective maximum or minimum. Subsequently, the adaptation of the array is completed by interpolating between the fixed points.

Particularly preferred is a characteristic data array that describes, determines and/or adapts the dependency of a third characteristic operating value on at least a fourth characteristic operating value, where predetermined vectors are subtracted from each of the array vectors, which in particular accomplishes the result that the characteristic data array or more specifically, the third characteristic operating value or the curve profile of the latter, is substantially independent of the tenth characteristic operating value.

The tenth characteristic operating value in the sense of the present invention is in particular a torque such as an engine torque or input torque of the input device, or an rpm rate such as an engine rpm rate or input rpm rate of the input device.

Preferably, a base portion of a controlling quantity, such as a base portion of the current of the ratio-shifting valve, is subtracted from a predetermined coordinate of the characteristic data array or, in other words, from a predetermined vector component of the characteristic data array, specifically from a component whose value is determined by the dependency of the characteristic data array on the tenth characteristic operating value.

Preferably, the vector component or vector that is to be subtracted is a calculated quantity.

With preference, the vectors have a component that is associated with the third characteristic operating value, and the value that is being subtracted is indicative of a dependent relationship between the tenth and third characteristic operating values. In particular, the subtracted value corresponds to the value of the third characteristic operating value which, in turn is based on an amount of the tenth characteristic operating value that results from the determination and/or adaptation of the characteristic data array.

It is particularly preferred to establish a two-dimensional characteristic data array, specifically a characteristic curve, that represents the dependency of an electric current supplied to a solenoid valve such as a ratio-shifting valve on the actuator force ratio, i.e., the ratio between the axial force on the disc pair of the input device and the axial force on the disc pair of the output device. The shift position of the solenoid valve, in this case a ratio-shifting valve, has a direct influence on the force acting on the disc pair of the input device and/or output device. The preferred modus operandi further includes calculating or determining the dependence of the third or fourth characteristic operating value, i.e., particularly of the actuator force ratio or the solenoid current, on the engine torque. The actually existing engine torque is determined, and a corresponding amount of current is subtracted from the fourth characteristic operating value, i.e., from the value for the solenoid current of the ratio-shifting valve that has been determined. This subtracting procedure serves to make the characteristic curve substantially independent of the engine torque or to take the influence of the engine torque on the characteristic curve into account from the outset.

Preferably, either as a supplemental or alternative procedure, the characteristic curve is made independent of an rpm rate such as an input rpm rate of the input device or an engine rpm rate or other rpm rate, by determining or calculating the dependence of the characteristic curve profile on that rpm rate and subtracting the corresponding amounts, or subtracting a corresponding characteristic curve, from the fourth characteristic operating value, where the fourth characteristic operating value is in particular an electric current that is supplied to a solenoid valve, in this case a ratio-shifting valve. Preferably in this procedure, the actual rpm rate that was present at the determination of the characteristic curve profile is determined or measured.

With particular preference, a characteristic data array is determined or adapted that represents the dependence of the actuator force ratio on the engine torque and on the engine rpm rate. The adaptation of the characteristic data array can be made in the manner described above.

According to a particularly preferred embodiment of the invention, the characteristic curve of the solenoid valve, particularly of the ratio-shifting valve, is represented by a characteristic equation which is used to determine the characteristic data array. Specifically, this equation is $$p_{ss1} = \frac{14}{100} \times (I_{VUN} - I_{VU}),$$

and/or $$p_{ss2} = \frac{14}{100} \times (I_{VU} - I_{VUN}),$$

wherein $P_{ss1}$ represents the pressure of the operating medium such as a hydraulic fluid, which pressure exists substantially independent of the position of the torque sensor and acts on the disc pair of the input device in the direction of the shift movement;

$P_{ss2}$ represents the pressure of the operating medium such as a hydraulic fluid, which pressure exists substantially independent of the position of the torque sensor and acts on the disc pair of the output device in the direction of the shift movement;

$I_{VU}$ represents a portion of an electric current supplied to a solenoid valve, in particular a ratio-shifting valve that is arranged in a hydraulic circuit of the control- and/or actuator device and whose valve position has an effect on the force acting on the disc pair of the input device and/or the disc pair of the output device in the respective direction of the shift movement, where the valve serves in particular to shift the transmission ratio between the disc pair of the input device and the disc pair of the output device; and $I_{VUN}$ represents a specific current level of $I_{VU}$ corresponding to a condition where both the pressure $P_{ss1}$ in a predetermined chamber of the input device and the pressure $P_{ss1}$ in a predetermined chamber of the output device are equal to zero or equal to the ambient pressure existing outside the torque-transmitting system.

According to a particularly preferred embodiment of the invention, one of the following equations is used for determining a characteristic data array and/or the control signal and/or the current supplied to a solenoid valve arranged in a hydraulic circuit of the control device and/or of the actuator device, in particular a ratio-shifting valve:

$$F_{SS1} = p_{MF} \times k_1 + p_{SS1} \times k_2 + F_1(n^2_{in}) + F_2(n^2_{in}),$$

and/or $$F_{SS2} = p_{MF} \times k_3 + p_{SS2} \times k_4 + F_{sp} + F_3(n^2_{out}) + F_4(n^2_{out}) + F_5(n^2_{out}),$$

$$\text{and/or } \zeta = \frac{F_{SS1}}{F_{SS2}}, \text{ and/or}$$

$$I_{VU} = \frac{-\zeta \times (p_h \times k_3 + F_{sp} + F_3 + F_4 + F_5) - (p_h \times k_1 + F_1 + F_2) + \frac{14}{100} \times I_{VUN} \times (k_2 + \zeta \times k_4)}{\frac{14}{100} \times I_{VUN} \times (\zeta \times k_4 + k_2)}.$$

Following is an explanation of the symbols used in the preceding equation:

$F_{SS1}$ represents the actuator force that is generated by the hydraulic arrangement of the control- and/or actuator device and is acting on the disc pair of the input device in the axial direction (i.e., the shifting direction) of the latter.

$F_{SS2}$ represents the actuator force that is generated by the hydraulic arrangement of the control- and/or actuator device and is acting on the disc pair of the output device in the axial direction (i.e., the shifting direction) of the latter.

$\zeta$ represents the actuator force ratio of the torque-transmitting system, i.e., the ratio between the sum of the forces effected by the control- and/or actuator device and acting on the disc pair of the input device in relation to the sum of the forces effected by the control- and/or actuator device and acting on the disc pair of the output device, while preferably the transmission ratio between the disc pairs of the input and output device is kept constant.

$P_h$ represents the holding pressure or torque-sensor pressure, i.e., the hydraulic pressure that acts on the disc pair of the input- and/or output device, dependent in magnitude on the position of the torque sensor.

$F_1$ and $F_2$ represent force components resulting from dynamic effects of the hydraulic fluid in a state of rapid rotation, acting on the disc pair of the input device in the direction of the shift movement, dependent in magnitude on the square of the rpm rate of the disc pair of the input device.

$F_3$, $F_4$, $F_5$ represent force components resulting from dynamic effects of the hydraulic fluid in a state of rapid rotation, acting on the disc pair of the output device in the direction of the shift movement, dependent in magnitude on the square of the rpm rate of the disc pair of the output device.

$F_{sp}$ represents the elastic force of a spring which is arranged at or inside the output device, acting on the disc pair of the output device in the direction of movement of the latter.

$k_1$, $k_2$ represent factors that, at least in part, describe geometric characteristics of the torque-transmitting system, in particular of the input device.

$k_3$, $k_4$ represent factors that, at least in part, describe geometric characteristics of the torque-transmitting system, in particular of the output device.

$n_{in}$ represents the rpm rate of the disc pair of the input device.

$n_{out}$ represents the rpm rate of the disc pair of the output device.

Preferably, in determining the at least two-dimensional characteristic data array according to the foregoing formula that ties the portion $I_{VU}$ together with the actuator ratio $\zeta$ and further characteristic values, the actuator ratio $\zeta$ is established in function of the transmission ratio between the disc pair of the input device and the disc pair of the output device in the manner described above, i.e., by searching for local extremes in a characteristic data array that represents the relationship between the actuator ratio $\zeta$ and the transmission ratio or overall transmission ratio.

With special preference, the current $I_{VU}$ (having been computed in the manner described above) and/or a predetermined characteristic value such as a first characteristic value, and/or a predetermined characteristic operating value such as a first or eighth operating value is used for the control of the torque-transmitting system, or more specifically, is used as a base portion of the control for the actuation of the torque-transmitting system, in particular as a base portion of the ratio-shifting control or -regulation of the disc pair of the input device and/or of the output device, which base portion of the signal produces a predetermined actuating effect on the disc pair of the input device and/or the disc pair of the output device, so that a predetermined transmission ratio is set with a coarse degree of accuracy. A superimposed regulating signal, which together with the base portion constitutes the control signal, is used for the fine adjustment of the predetermined transmission ratio.

Preferably, at least one characteristic operating value of the torque-transmitting system or of a vehicle with a torque-transmitting system is learned during the operation of the system, so that in particular an adaptation can be performed when characteristic data arrays have changed because of wear, repair measures, or for other reasons. Preferably, the learning of the characteristic operating value takes place in a quasi-static state of the torque-transmitting system and/or of the vehicle with the torque-transmitting system. With special preference, the actuator force ratio is among the characteristic operating values that are learned by the system.

With preference, during the determination and adaptation of at least one characteristic operating value and/or at least one at least two-dimensional characteristic data array, the torque-transmitting system is shifted in the direction towards an underdrive position and/or from an overdrive position in the direction towards an underdrive position. In particular, this shift process is performed slowly and/or by a small amount.

Preferably, at least one of the characteristic data arrays and/or at least one characteristic operating value is determined as a function of at least one amplitude of an oscillation which occurs in the transmission ratio between the disc pair of the input device and the disc pair of the output device, where in particular the peak values of these amplitudes are used as minima and maxima in the process of adapting a characteristic data array in accordance with the foregoing description.

Preferably, in order to determine the control signal, different force components are taken into account, whose sum acts on the input device and/or the output device. Each of these force components is either zero or different from zero. In certain cases, different force components are generated according to different characteristic curves or arrays. It is especially preferred to generate at least one predetermined force component by means of a torque sensor and to generate at least one force component by a procedure in which a solenoid valve such as a ratio-shifting valve is supplied with a predetermined amount of current to control the pressure of a hydraulic fluid acting on a disc pair of the input device and/or output device.

Preferably, a torque-transmitting system according to the invention or a vehicle with the torque-transmitting system according to the invention has at least one sensor device that is used to determine and/or adapt at least one characteristic operating value and/or at least one characteristic value and/or at least one characteristic data array. Preferably, a value determined by the sensor device, i.e., a characteristic operating value and/or a characteristic value, is used to compute the control signal.

In particular, the at least one sensor device includes a current sensor and/or rpm sensor and/or torque sensor and/or pressure sensor.

The present invention includes in particular a method in which at least one predetermined characteristic operating value and/or characteristic value and/or at least one predetermined characteristic data array is determined and/or adapted, in particular while the torque-transmitting system is in an operating state, and is used in some cases to generate at least one control signal that causes a disc pair of an input device and/or output device to be actuated in accordance with a predetermined characteristic curve or data array.

In particular, the inventive method can include steps in which a control signal is computed and subsequently generated, which can effect a shift of the transmission ratio between an input device and an output device, where in the course of transmitting the control signal to the input device and/or output device, the signal can in some cases be converted from one kind of signal into a different kind of signal, and where the conversions between different types of signals are taken into account in the computation of the control signal.

There are cases in which the signal conversion is designed as follows: A control signal such as an electric current or a voltage is supplied to a solenoid valve, whereby the aperture of the valve is changed. The aperture has at least a part in determining the pressure of a hydraulic fluid flowing through the valve. This signal type, i.e., the pressure, acts on a surface area of the input device and/or the output device. The cooperation between that surface area and the pressure produces another type of signal, i.e., a force, to act on the input device and/or the output device in the direction of the shift movement.

The relationships by which one type of signal is coupled to another are taken into account in the sense that, based on targeted amounts of force to be exerted on the input device and/or output device, specifically on the disc pairs of the input and/or output device, the magnitude of a control signal such as an electric current or voltage is computed which will be required in order to generate the targeted amount of force. Based on this computation, the control signal is subsequently generated.

The term "control" in the sense of the present invention is to be understood in particular as the activity of "controlling" and/or "regulating" as defined in German industry standards (DIN). The same applies to terms that are derived from the term "control".

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, embodiments of the invention are discussed on the basis of the illustrated examples which, however, are not to be interpreted as limitations on the scope of possibilities encompassed by the invention.

DETAILED DESCRIPTION OF PREFERRED EMBODIMENTS

Figure 1:
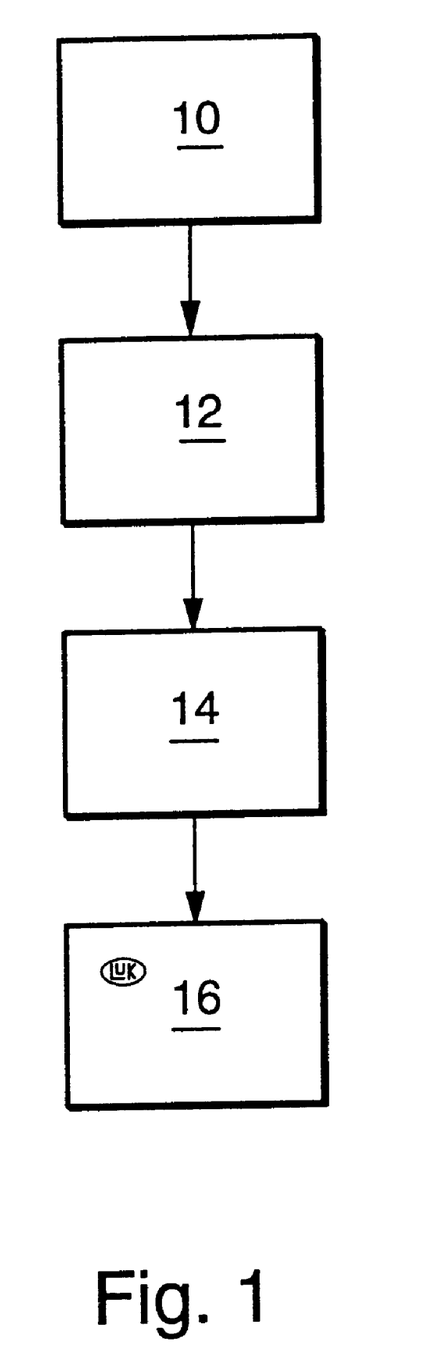
FIG. 1 represents the steps in an example of the method according to the invention.

FIG. 1 illustrates the steps in an example of a method according to the invention.

Step 10 represents the act of establishing the magnitude of each of the forces that is to act on the input device and/or output device in the axial direction, i.e., the step of setting the target forces. There can be cases where a separate determination is made for different force components of the respective forces acting on the input device and/or output device, or the determination is made for a part of a force component. The term "force" is to be understood in particular as the total force or force component.

The subsequent steps 12 and 14 represent the computation of a control signal which will have the result of generating the targeted forces. In particular with regard to the force component that effects a shift in the transmission ratio between the respective disc pairs of the input device and the output device, the computation of the control signal is performed as follows:

In step 12, the amount of pressure is calculated that would have to act on the input device and/or output device in order to generate the targeted amount of force (calculation of the target pressure). Based on the target pressure, i.e, a different type of signal than the target force, the valve position is calculated in step 14, that would have to be set in the ratio-shifting valve in order to produce the target pressure. Based on the calculated target position of the valve, again a different type of signal, the amount of the electric current is calculated in step 14, that would have to be supplied to the valve in order to set the latter to the targeted position (calculation of the target current).

After the amount of current, i.e., the control signal, has been calculated, the control signal is then generated in step 16 so that the input device and/or output device will be actuated by a force or force component corresponding substantially to the target force.

As an alternative, step 14 can also be organized so that, based on an applicable characteristic curve of the valve, the target current is calculated that would have to be supplied to the ratio-shifting valve in order to generate the predetermined target pressure at the input device and/or output device. The characteristic curves of the valve indicate in particular the actuating pressure of a hydraulic fluid for shifting the input device and/or output device as a function of the current supplied to the ratio-shifting valve.

Figure 2:
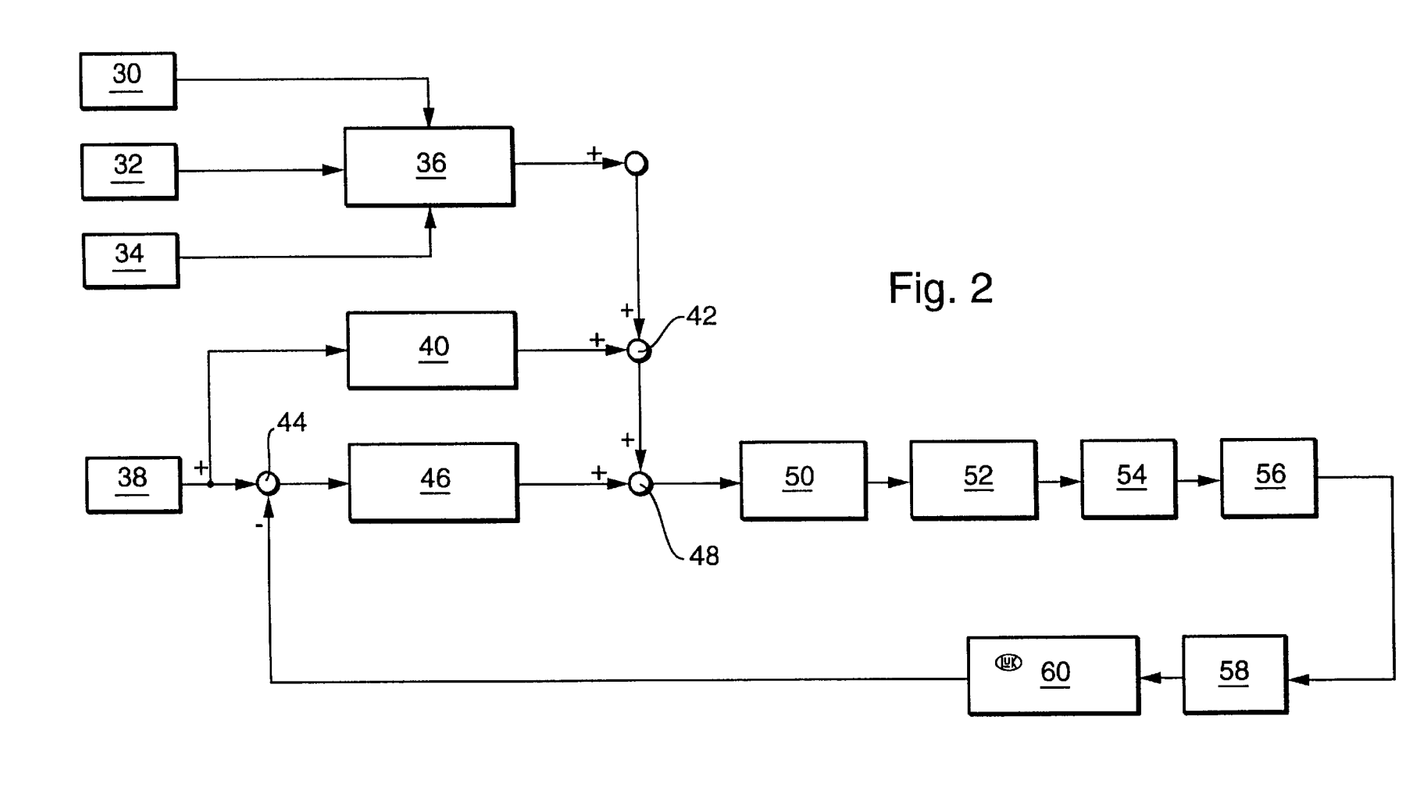
FIG. 2 gives a schematic representation of a first example of an embodiment of the method according to the invention.

FIG. 2 illustrates the steps in an example of a method according to the invention.

In step 30, data about the magnitude of the engine torque are made available in a motor vehicle with a torque-transmitting system. The torque-transmitting system has a disc pair of an input device and a disc pair of an output device.

In step 32, the rpm rate of the disc pair of the output device is made available.

In step 34, the transmission ratio between the disc pair of the input device and the disc pair of the output device is made available.

In step 36, a portion of a holding force or a holding force is calculated based on the amounts of the engine torque, the rpm rate and the transmission ratio. The holding force to be calculated is the amount of force that needs to be applied to the disc pair of the input device and/or output device independently of ratio-shifting forces that may also be called for in any given case.

In step 38, a target rpm rate or a targeted rate of change of an rpm rate to be generated in a transmission input shaft or, specifically, in a disc pair of the input device, is calculated or determined.

In step 40, an amount of change is calculated that has to occur in the force acting on the input device and/or output device dependent on the targeted rpm rate of the transmission input shaft or the disc pair of the input device or the targeted rate of change of the rpm rate. The purpose of the targeted change in the force is in particular to cause a shift in the transmission ratio between the disc pairs of the input device and the output device.

In step 42, the targeted force change and the share contributed by the holding force as calculated in step 36 are added together into a resultant target force.

In step 44, the difference is determined between the targeted change of the rpm rate of the input shaft or the disc pair of the input device and the actually occurring rate of change of that rpm rate.

In case a step 46 is included as part of the method, a corrective amount of force is determined by means of a PI servo (proportional/integrating feedback controller) dependent on the difference found in step 44, and the discrepancy is compensated, if necessary.

In step 48, the resultant target force from step 42 and a correction for the difference found in step 44 are added together into one combined overall target force that is to be applied to the disc pair of the input device and/or output device.

In step 50, an amount of pressure is calculated that needs to be present at the disc pair of the input device and/or output device in order to generate the combined overall target force that was determined in step 48.

In step 52, an amount of electric current is calculated that needs to be supplied to the ratio-shifting valve in order to generate the amount of pressure that was calculated in step 50 (determination of the target current).

In step 54, the value for the target current as determined in step 52 is entered into a current regulator which generates a current corresponding to the target value.

In step 56, the current generated in step 54 causes a shift in the torque-transmitting system or, more specifically, it causes a shift in the positions of the disc pairs of the input device and/or output device, so that the rpm rate of the disc set of the input device and/or the output device changes to a predetermined level.

In case a step 58 is included as part of the inventive method, the rpm rate is filtered in order to eliminate interfering signals such as noise and the like. In step 60, a change in the actual rpm rate is determined or effected through the formation of a gradient.

The invention further relates to DE 195 44 644, DE 195 46 293, DE 195 46 294, DE 197 27 358, DE 197 21 036, and DE 198 26 747, which are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A continuously variable transmission comprising: an input device with a first pair of conical discs and an output device with a second pair of conical discs, the first and second pairs of conical discs being adjustable in relation to each other by adjusting a transmission ratio between the first and second pairs of conical discs; an endless flexible torque-transmitting device connecting the first and second pairs of conical discs; an actuator device performing on the input device and the output device at least one of the actuator functions of adjusting a shift position of said devices in relation to each other and of holding said devices at a set shift position, wherein the adjusting is performed by exerting a first adjusting force on the input device and a second adjusting force on the output device, and whereing the holding is performed by exerting a first holding force on the input device and a second holding force on the output device; a control device generating a control signal and transmitting said control signal to the actuator device, whereupon the latter performs said at least one actuator function dependent on said control signal; and a computing device for computing and, if necessary, repeatedly adapting, a first at least two-dimensional characteristic data array, wherein the continuously variable transmission further has a first characteristic operating value, and the first characteristic data array describes a functional dependency of the first characteristic operating value on at least one further characteristic operating value; wherein the first characteristic operating value is dependent on the ratio between the first holding force and the second holding force.

2. The continuously variable transmission of claim 1, wherein the computing device computes the first characteristic data array at least in part during a time period when the continuously variable transmission is in operation.

3. The continuously variable transmission of claim 1, further comprising a memory storage device for storing at least a first characteristic value; wherein said first characteristic value determines at least in part a signal transfer behavior between the control device and at least one of the input device and the output device; the computing device computes the control signal as a dependent function of the first and second holding forces that are to be applied.

4. The continuously variable transmission of claim 3, wherein the control signal, having been computed by the computing device, is generated by the control device and transmitted to the actuator device.

5. The continuously variable transmission of claim 3; wherein the signal transfer behavior is defined by a signal-transfer path between the control device and at least one of the input device and the output device; along the signal-transfer path a chain of variables are tied together by coupling functions; the control device contains at least a partial image representation of said coupling functions; and the control signal is generated dependent on said image representation.

6. The continuously variable transmission of claim 5, wherein the variables in said chain include forces, and the coupling functions between the forces are taken into account in computing and generating the control signal.

7. The continuously variable transmission of claim 3, wherein the first characteristic value belongs to the group of parameters consisting of a hydraulic pressure of an operating fluid at a predetermined location in the continuously variable transmission and a predetermined surface area of a component of the continuously variable transmission.

8. The continuously variable transmission of claim 3, comprising at least one signal-transfer path leading from the control device to at least one of the input device and the output device, wherein the first characteristic value is indicative of a geometric characteristic of a component of the continuously variable transmission, said component being disposed along the at least one signal-transfer path.

9. The continuously variable transmission of claim 1, wherein at least one of the control device and the actuator device comprises at least a part of a solenoid valve.

10. The continuously variable transmission of claim 1, wherein at least one of the control device and the actuator device comprises at least a part of a ratio-shifting valve, said ratio-shifting valve being shiftable between variable operating positions, thereby effecting a change in a transmission-ratio between the input device and the output device.

11. The continuously variable transmission of claim 10 wherein the ratio-shifting valve is a solenoid valve.

12. The continuously variable transmission of claim 10, wherein the ratio-shifting valve is further effecting that a set transmission ratio is maintained while the continuously variable transmission is transmitting torque.

13. The continuously variable transmission of claim 1, further comprising an input shaft and a torque sensor for sensing an input torque received by the input shaft, wherein said torque sensor generates a further characteristic operating value dependent on the input torque, and at least one of the input device and the output device under a set of predetermined conditions is actuated dependent on the further characteristic operating value.

14. The continuously variable transmission of claim 1, wherein the actuator performs the actuator function of adjusting the shift positions of the input device and the output device in relation to each other by exerting at least one ratio-shifting force on at least one of the input device and the output device.

15. The continuously variable transmission of claim 14, wherein the ratio-shifting force is superimposed on the holding force to shift the transmission ratio.

16. The continuously variable transmission of claim 14, comprising at least one signal-transfer path leading from the control device to at least one of the input device and the output device and operative components disposed within said signal-transfer path, wherein at least one surface area of one of the operative components is subjected to a hydraulic pressure of an operating fluid and, in generating the control signal, the control device takes into account that a pressure acting against a surface will produce on said surface a resultant force that is proportionate to said pressure.

17. The continuously variable transmission of claim 16, wherein at least one of the actuator device and the control device comprises a solenoid valve and, in generating the control signal, the control device takes into account a mathematical relationship between a hydraulic pressure in at least one predetermined location and a controlling current of the solenoid valve.

18. A method of operating the continuously variable transmission of claim 16, comprising the steps of:
   a') computing at least one control signal;
   b') transmitting the at least one control signal along at least one signal-transfer path;
   c') in the course of step b'), converting the at least one control signal at least once from one to another of the signal types consisting of electrical, mechanical, hydraulic, and pneumatic signals;
   d') delivering the converted control signal to the actuator device; thereby causing the latter to perform one of the actuator functions;
   wherein the at least one conversion of step c') is taken into account at least partially when performing step a'), so that the converted control signal will have a magnitude corresponding to a predetermined target value.

19. The continuously variable transmission of claim 13, further comprising an output shaft for transmitting an output torque, wherein a further characteristic operating value depends on at least one of the input torque and the output torque.

20. The continuously variable transmission of claim 13, wherein the computing device is provided with data from the group consisting of a first plurality of different characteristic values and a second plurality of different further characteristic operating values, said data being indicative of a mode of physical cooperation between elements of the continuously variable transmission, and the computing system uses at least one formulaic relationship between said data to compute and, if necessary, adapt at least one of the control signal and the at least one characteristic data array.

21. The continuously variable transmission of claim 20 wherein predetermined fixed points are established for use in at least one of the computing and adapting of the at least one relationship.

22. The continuously variable transmission of claim 21, wherein the predetermined fixed points are predetermined in number.

23. The continuously variable transmission of claim 22, wherein the number of fixed points is determined during a time when at least one of the computing and updating is performed.

24. The torque-transmitting system of claim 22, wherein the predetermined number is eight.

25. The continuously variable transmission of claim 21, wherein the fixed points are established based on an already known characteristic data array.

26. The continuously variable transmission of claim 21, wherein the fixed points are more than once subjected to at least one of the computing and adapting.

27. The continuously variable transmission of claim 21, wherein the fixed points are arranged with higher density in areas of the at least one characteristic data array where instabilities are expected to occur.

28. The continuously variable transmission of claim 21, wherein at least one fixed point is arranged essentially in an area of the at least one characteristic data array corresponding to a maximum transmission-ratio of the continuously variable transmission, and at least one fixed point is arranged essentially in an area of the at least one characteristic data array corresponding to a minimum transmission-ratio of the continuously variable transmission.

29. The continuously variable transmission of claim 21, wherein the continuously variable transmission has a further characteristic operating value and at least said further characteristic operating value is within a predetermined range of values during a time when at least one of the computing and adapting is in progress.

30. The continuously variable transmission of claim 29, wherein the first characteristic data array is represented by a set of first data vectors, at least one of a characteristic operating value relating to at least one of the first and second adjusting and holding forces and the first characteristic data array has a dependency on the at least one first characteristic operating value, and wherein further, after completing the at least one of computing and adapting, the predetermined vectors are subtracted from the first data vectors in order to account for a dependency of the operating values of the adjusting and holding forces from the at least one first characteristic operating value.

31. The continuously variable transmission of claim 30, wherein at least one vector of each of the predetermined vectors is calculated.

32. The continuously variable transmission of claim 30, further comprising a solenoid valve for controlling the transmission ratio, wherein the first characteristic data array is determined as a function of at least one valve characteristic of the solenoid valve.

33. The continuously variable transmission of claim 32, wherein the at least one valve characteristic comprises at least one of $P_{ss1}=f(I_{VUN}, I_{VU}, k)$ and $P_{ss2}=f(I_{VUN}, I_{VU} k)$;

$P_{ss1}$ representing a hydraulic fluid pressure that is substantially independent of a position of the torque sensor and is operative to shift a position of the first pair of conical discs;

$P_{ss2}$ representing a hydraulic fluid pressure that is substantially independent of a position of the torque sensor and is operative to shift a position of the second pair of conical discs;

$I_{VU}$ representing a current of variable magnitude for controlling the solenoid valve;

$I_{VUN}$ representing a specific current level of $I_{VU}$ corresponding to a condition where both $P_{ss2}$ and $P_{ss1}$ are equal to an ambient pressure existing outside the continuously variable transmission; and k representing a factor dependent on geometric characteristics of the continuously variable transmission.

34. The continuously variable transmission of claim 33, further comprising an output part with a chamber and a spring arranged in said chamber, wherein $$I_{VU} = \frac{-\zeta \times (p_h \times k_3 + F_{sp} + F_3 + F_4 + F_5) - (p_h \times k_1 + F_1 + F_2) + k \times I_{VUN} \times (k_2 + \zeta \times k_4)}{k \times I_{VUN} \times (\zeta \times k_4 + k_2)}$$

$\zeta$ representing the force ratio between the first axial holding force acting on the first pair of conical discs and the second axial holding force acting on the second pair of conical discs;

$P_h$ representing a holding pressure that generates the first and second axial holding forces;

$F_1, F_2, F_3, F_4, F_5$ representing force components resulting from dynamic effects of hydraulic fluid in a state of rapid rotation in the input device and the output device;

$F_{sp}$ representing a spring force of the spring; and $k_1, k_2, k_3, k_4$ representing factors dependent on geometric characteristics of the continuously variable transmission.

35. The continuously variable transmission of claim 34, wherein at least one characteristic operating value is established through a learning process during operation of the continuously variable transmission.

36. The continuously variable transmission of claim 35, wherein the learning process occurs while the continuously variable transmission is operating in a quasi-static mode.

37. The continuously variable transmission of claim 36, wherein the at least one characteristic operating value is the force ratio $\zeta$.

38. The continuously variable transmission of claim 21, wherein the at least one characteristic data array has local extremes that are established and used as fixed points.

39. The continuously variable transmission of claim 38, wherein the local extremes are represented by vectors, each local extreme has a nearest fixed point, and the fixed points are modified dependent on the local extremes by replacing said nearest fixed point with the vector of the local extreme.

40. The continuously variable transmission of claim 21, wherein the predetermined fixed points are established by using mathematical curve-fitting procedures including but not limited to linear interpolation.

41. The continuously variable transmission of claim 21, wherein the predetermined fixed points are associated with the third characteristic operating value, and said third operating value is initially set at a constant predetermined value when at least one of the computing and adapting is performed.

42. The continuously variable transmission of claim 20, wherein during the computing and, if necessary adapting, of at least one of a characteristic operating value and a characteristic data array, the continuously variable transmission is shifted in at least one of the modes consisting of shifting out of an overdrive condition at low speed and shifting towards an underdrive condition by a small amount.

43. The continuously variable transmission of claim 42, wherein the transmission ratio between the input device and the output device is subject to oscillations during operation of the continuously variable transmission, and the learning process serves to establish at least one of the characteristic operating values and characteristic data arrays as a function of an amplitude of said oscillations.

44. The continuously variable transmission of claim 20, wherein one of the at least one further characteristic operating values belongs to the group of variables consisting of a hydraulic pressure of an operating fluid at a predetermined location in the continuously variable transmission, a force acting at a predetermined location in a force-transfer path from the control device to one of the input device and the output device, and a solenoid current of a solenoid valve.

45. The continuously variable transmission of claim 20, wherein one of the plurality of fourth characteristic values is a predetermined surface area of a component of the continuously variable transmission that is subjected to a hydraulic pressure of an operating fluid.

46. The continuously variable transmission of claim 1, wherein the holding force is generated by means of a hydraulic fluid.

47. The torque-transmitting system of claim 1, wherein the control device uses the third characteristic operating value to set the at least one holding force.

48. The continuously variable transmission of claim 1, wherein the computing device uses arithmetic operations to compute the third characteristic operating value from the second and third characteristic data arrays.

49. The continuously variable transmission of claim 1, wherein the input device and the output device are rotatably supported in bearings and a further characteristic operating value depends on the transmission ratio.

50. The continuously variable transmission of claim 1, wherein at least one of the characteristic data arrays is updated at least in part during a time period when the continuously variable transmission is in operation.

51. The continuously variable transmission of claim 50, wherein the first characteristic operating value undergoes a change during the lifetime of the continuously variable transmission and at least one of the second and third characteristic data arrays is adapted to said change.

52. The continuously variable transmission of claim 1, wherein the characteristic operating value for the first and second adjusting and holding forces belongs to the group of variables consisting of an input rpm rate of the input device, a dependent function of said input rpm rate, the engine rpm rate of a motor vehicle, and a dependent function of said engine rpm rate.

53. The continuously variable transmission of claim 1, wherein one of the further characteristic operating values belongs to at least one variable of the group of variables consisting of the transmission ratio, a dependent function of the transmission ratio, an engine rpm rate of a motor vehicle, a dependent function of said engine rpm rate, an engine torque of the motor vehicle, a dependent function of said engine torque, a temperature, and a dependent function of the temperature.

54. The torque-transmitting system of claim 1, wherein the sixth characteristic operating value is the engine torque of a motor vehicle.

55. The continuously variable transmission of claim 1, wherein at least one of the further characteristic operating values is a hydraulic pressure of an operating fluid at a predetermined location in the continuously variable transmission.

56. The continuously variable transmission of claim 1, wherein the control device, in generating the control signal, the control device takes into account a plurality of separate force components and causes a resultant sum of said force components to act on at least one of the input device and the output device.

57. The continuously variable transmission of claim 1, further comprising at least one sensor device for detecting at least one characteristic operating value used for at least one of the computing and adapting of at least one of a characteristic operating value and a characteristic data array.

58. A method of operating the continuously variable transmission of claim 1, comprising the steps of:

a) identifying at least one characteristic operating value on which at least one actuator force depends by which the actuator functions are performed; and b) adapting said at least one characteristic operating value.

\* \* \* \* \*